United States Patent
Luoma et al.

(10) Patent No.: US 9,038,895 B2
(45) Date of Patent: May 26, 2015

(54) COMMUNICATION BETWEEN RETAILER AND CUSTOMER

(71) Applicant: OP-Palvelut Oy, Helsinki (FI)

(72) Inventors: Kristian Luoma, Helsinki (FI); Jussi Juntunen, Helsinki (FI); Petri Liimatta, Helsinki (FI); Tuomas Jomppanen, Helsinki (FI); Antti Laitala, Helsinki (FI)

(73) Assignee: OP-PALVELUT OY, Helsinki (FI)

( * ) Notice: Subject to any disclaimer, the term of this patent is extended or adjusted under 35 U.S.C. 154(b) by 0 days.

(21) Appl. No.: 14/072,962

(22) Filed: Nov. 6, 2013

(65) Prior Publication Data

US 2014/0231509 A1 Aug. 21, 2014

(30) Foreign Application Priority Data

Feb. 21, 2013 (FI) .................................. 20135155

(51) Int. Cl.
| | | |
|---|---|---|
| G06K 5/00 | (2006.01) | |
| G06Q 30/02 | (2012.01) | |
| G06Q 20/20 | (2012.01) | |
| G06Q 20/32 | (2012.01) | |
| G06Q 20/10 | (2012.01) | |

(52) U.S. Cl.
CPC .......... *G06Q 30/0207* (2013.01); *G06Q 20/204* (2013.01); *G06Q 20/322* (2013.01); *G06Q 20/102* (2013.01); *G06Q 30/02* (2013.01)

(58) Field of Classification Search
CPC ........................... G06Q 20/30; G06Q 20/3227
USPC ................. 235/379, 380, 383, 492; 705/14.1, 705/14.34, 14.36, 14.51, 16, 27.1
See application file for complete search history.

(56) References Cited

U.S. PATENT DOCUMENTS

| | | | |
|---|---|---|---|
| 6,467,685 B1 * | 10/2002 | Teicher ......................... | 235/379 |
| 8,127,982 B1 | 3/2012 | Casey et al. | |
| 8,140,418 B1 | 3/2012 | Casey et al. | |
| 8,302,859 B2 * | 11/2012 | Malhotra et al. .............. | 235/380 |
| 2003/0041026 A1 * | 2/2003 | Heinonen et al. .............. | 705/41 |
| 2010/0082420 A1 | 4/2010 | Trifiletti et al. | |
| 2010/0312636 A1 | 12/2010 | Coulter et al. | |
| 2012/0109733 A1 * | 5/2012 | Roper et al. ............... | 705/14.25 |

(Continued)

FOREIGN PATENT DOCUMENTS

EP          2099003          9/2009

OTHER PUBLICATIONS

FI Search Report dated Dec. 18, 2013; Application No. 20135155.

(Continued)

*Primary Examiner* — Seung Lee
(74) *Attorney, Agent, or Firm* — Young & Thompson

(57) ABSTRACT

Communication between a retailer and a customer is disclosed. A payment card and a communication identifier addressing a wireless transceiver of a mobile apparatus are registered to an electronic service. The mobile apparatus receives, with the wireless transceiver, a plurality of packets relating to payments with the payment card of a plurality of trades of various commodities between the user and a plurality of various retailers, from the electronic service, extracts from the received plurality of the packets transaction information relating to the payments and supplementary information, and communicates, with a user interface, the extracted transaction information and the supplementary information to the user.

18 Claims, 14 Drawing Sheets

(56) References Cited

U.S. PATENT DOCUMENTS

2012/0221421 A1    8/2012  Hammad
2012/0290449 A1*  11/2012  Mullen et al. ............... 705/27.2
2014/0006149 A1*   1/2014  Grigg et al. ................ 705/14.51

OTHER PUBLICATIONS

FI Office Action dated Apr. 10, 2015; Application No. 20135155.

* cited by examiner

COMMUNICATION BETWEEN RETAILER AND CUSTOMER

FIELD

The invention relates to communication between a retailer and a customer.

BACKGROUND

Due to the emerging electronic media, the communication between a retailer and a customer (or consumer) is becoming increasingly fragmented. Further sophistication is clearly desirable in order to relieve the customer from unwanted information, and in order to enable the retailer to communicate with the customer timely and precisely.

BRIEF DESCRIPTION

The present invention seeks to provide an improved mobile apparatus and an improved server.

According to an aspect of the present invention, there is provided a mobile apparatus comprising a wireless transceiver, a user interface, one or more processors, and one or more memories including computer program code, the one or more memories and the computer program code configured to, with the one or more processors, cause the mobile apparatus at least to perform: register, with the user interface and the wireless transceiver, a payment card of a user of the mobile apparatus, and a communication identifier addressing the wireless transceiver and associated with the registered payment card, to an electronic service; receive, with the wireless transceiver, a plurality of packets relating to payments with the payment card of a plurality of trades of various commodities between the user and a plurality of various retailers, from the electronic service; extract from the received plurality of the packets transaction information relating to the payments and supplementary information; and communicate, with the user interface, the extracted transaction information and the supplementary information to the user.

According to an aspect of the present invention, there is provided a computing resource comprising a communication interface, a memory interface, one or more processors, and one or more memories including computer program code, the one or more memories and the computer program code configured to, with the one or more processors, cause the computing resource at least to perform: receive, with the communication interface, a registration of a payment card of a user of a mobile apparatus, and a registration of a communication identifier addressing a wireless transceiver of the mobile apparatus and associated with the registration of the payment card, from the mobile apparatus; store, with the memory interface, the registration of the payment card, and the registration of the communication identifier; receive, with the communication interface, a plurality of transactions of the user, relating to payments with the payment card of a plurality of trades of commodities between the user and a plurality of various retailers; generate a plurality of packets, relating to the payments with the payment card, formed on the basis of the received plurality of the transactions; insert transaction information relating to the payments and supplementary information into the plurality of the packets; and transmit, with the communication interface, the plurality of the packets to the mobile apparatus addressed with the communication identifier.

The invention may provide at least one of the following advantages: bandwidth of electronic media is saved as the communication is more timely and precise, natural resources are saved as unnecessary paper documents need not be printed and mailed, data security is increased as the communication is in electronic format, storage is more safe as the communicated electronic documents are electronically stored, user interface is more compact and easy to use as the customer has one interface towards numerous retailers.

LIST OF DRAWINGS

Example embodiments of the present invention are described below, by way of example only, with reference to the accompanying drawings, in which FIG. 1 illustrates an example embodiment of a general operating environment;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although the apparatuses have been depicted as separate single entities, different parts may be implemented in one or more physical or logical entities.

Figure 1:
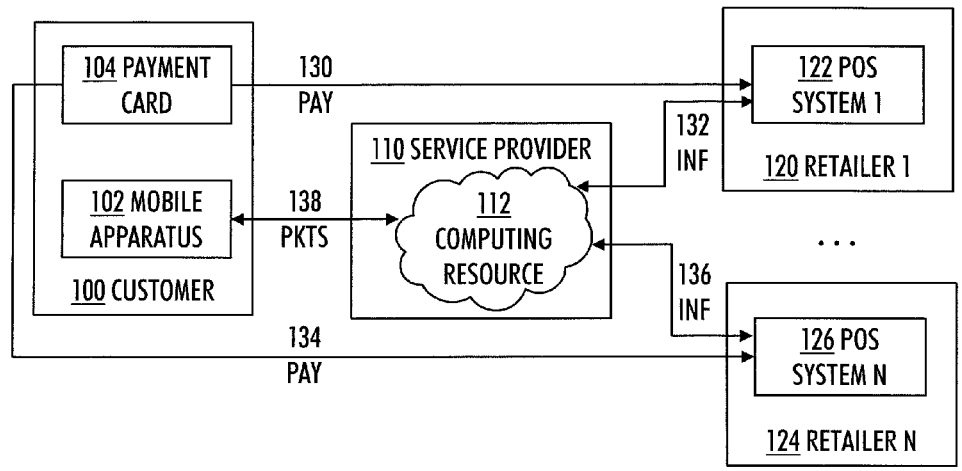

FIG. 1 illustrates an example embodiment of a general operating environment. A customer 100 interacts with a number N of retailers 120, 124, where N is any positive integer greater than one. The customer 100 has in his/her possession a payment card 104 and a mobile apparatus 102. Each retailer 120, 124 has a point of sale system 122, 126. The customer 100 purchases commodities from the retailers 120, 124, and makes payments 130, 134 with his/her payment card 104. A service provider 110 maintains a computing resource 112, which exchanges information 132, 136 with the point of sale systems 122, 126, and which also exchanges packets 138 with the mobile apparatus 102.

The customer 100 may also be known as a client, buyer, purchaser, or consumer. The retailer 120, 124 may also be known as a seller, vendor, or supplier, although the term "retail" here highlights the fact that the trade is business-to-consumer type rather than the business-to-business type. The retailer 120, 124 may operate in a shop such as a store, market, or shopping mall, for example, but the retailer 120, 124 may also operate without a shop, such as in an online environment realizing electronic commerce with electronic transactions and mail order.

A trade between the customer 100 and the retailer 120, 124 transfers the ownership of the commodity from the retailer 120, 124 to the customer 100, and the retailer 120, 124 gets a payment in exchange. The retailer 120, 124 may issue a receipt for the financial transaction.

The commodity is any marketable item produced to satisfy wants or needs, and the commodity comprises (consumer) goods and services.

The payment card 104 may be used by the cardholder 100 and accepted by the retailer 120, 124 to make payments 130, 134 for the trade. In an example embodiment, the payment card 104 may be a credit card or a debit (or bank) card, or any other suitable payment medium, for example. In an example embodiment, the payment card 104 may be implemented as a magnetic stripe card, smart card, or a proximity card, or with any other suitable technology, for example.

In an example embodiment, the point of sale system 122, 126 may be a simple point of sale terminal or it may comprise a number of different hardware and software components. The point of sale system 122, 126 may implement an electronic cash register, an inventory system, a customer relationship management system etc.

Figure 5:
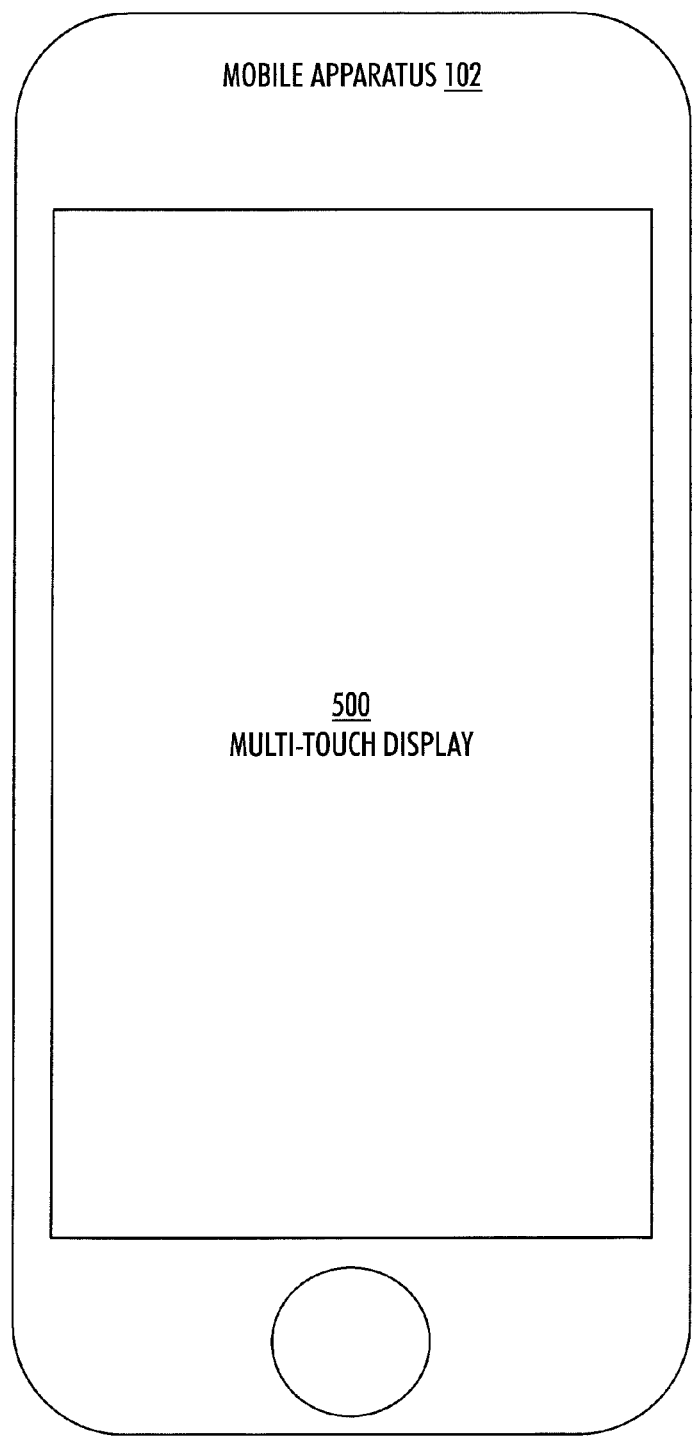
FIG. 5 illustrates a further example embodiment of the mobile apparatus.

In an example embodiment, the mobile apparatus 102 is a portable electronic communication apparatus. A non-exhaustive list of the types of the mobile apparatus 102 includes: a mobile phone, a smartphone, a tablet computer, a general-purpose mobile computing device. In an example embodiment, the mobile apparatus 102 is a general-purpose off-the-shelf computing device, as opposed to a purpose-build proprietary equipment, whereby research & development costs will be lower as only the special-purpose software (and not the hardware) needs to be designed, implemented and tested. In FIG. 5, an example embodiment of the mobile apparatus 102 is illustrated: the mobile apparatus 102 is a smartphone or a tablet employing a multi-touch display 500. Such devices may employ a suitable operating system such as iOS, Android, or Windows Phone, for example.

In an example embodiment, the computing resource 112 is a part of the client-server computing model that acts as distributed application which partitions tasks or workloads between the provider of a resource or service, called server 112, and the service requester, called client 102. The computing resource 112 is a host that is running one or more server programs which share their resources with clients 102. The computing resource 112 may also operate according to the cloud computing model implementing the network-based service, which appears to be provided by real hardware, but is in fact provided by virtual hardware, simulated by software running on one or more real computers. Naturally, besides these example embodiments of the computing resource 112, other feasible computing architectures may be utilized as well to implement the hardware and software of the computing resource 112. Consequently, besides operating according to the client/server architecture, push technology may be utilized as well. In push technology, the request for a transaction is initiated by the computing resource 112, whereas with the pull technology the request for the information is initiated by the client 102.

Figure 2:
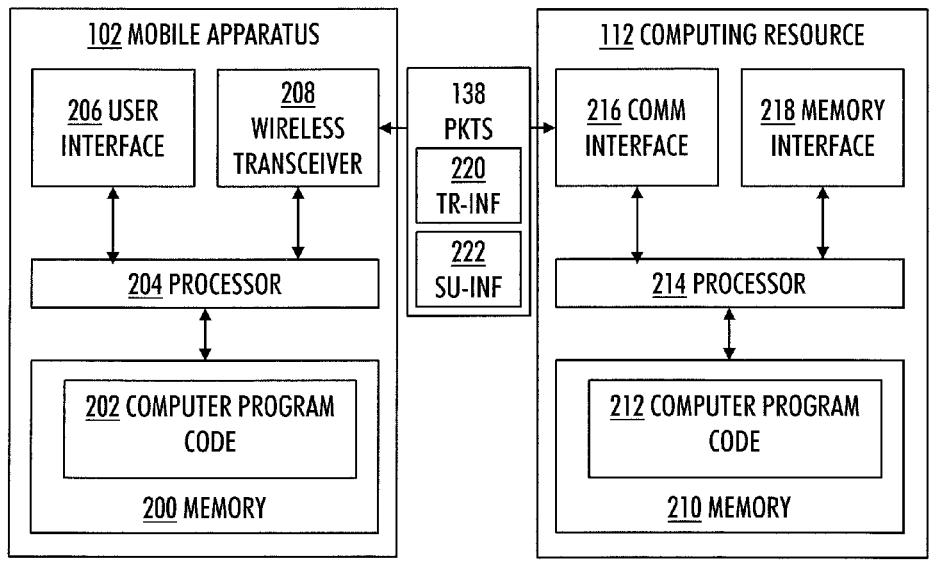
FIG. 2 illustrates example embodiments of a mobile apparatus and a computing resource.

Next, let us study FIG. 2 illustrating example embodiments of the mobile apparatus 102 and the computing resource 112.

The mobile apparatus 102 comprises a wireless transceiver 208, a user interface 206, one or more processors 204, and one or more memories 200 including computer program code 202.

In an example embodiment, the wireless transceiver 208 may be interoperable with various wireless standard/non-standard/proprietary communication networks such as any mobile phone network, regardless of the generation (such as 2G, 3G, 4G, beyond 4G, etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd Generation Partnership Project), IMT (International Mobile Telecommunication), LTE (Long Term Evolution, LTE-A (LTE-Advanced), and other radio systems (in their present forms and/or in their evolution forms), such as WLAN (Wireless Local Area Network) based on IEEE (Institute of Electrical and Electronics Engineers) 802.11 standard or its evolution versions (IEEE 802.11 ac etc.), WiMAX (Worldwide Interoperability for Microwave Access, or Wi-Fi, for example.

In an example embodiment, the wireless transceiver 208, while communicating with a mobile phone network, may require a subscriber identity module (SIM), which may be an integrated circuit storing subscriber data, which is network-specific information used to authenticate and identify subscribers on the cellular network. The subscriber identity module may be embedded into a removable SIM card, on a mini-SIM card, for example. Furthermore, the mobile apparatus 102 may include a SIM card reader, for example. Besides being implemented on a SIM card, the subscriber identity module may be implemented with other techniques as well, such as a virtual/embedded SIM.

In an example embodiment, the user interface 206 implements the exchange of graphical, textual and auditory information with the customer 100. The user interface 206 may be realized with various techniques, such as a display, means for producing sound, a keyboard, and/or a keypad, for example. The display may be a liquid crystal display, for example, but it may also be implemented by any appropriate technique, such as with an active-matrix organic light-emitting diode. The display may also incorporate other user interaction means, such as touch input, or haptic feedback, i.e. the display may be a touch screen. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, the user interface 206 may comprise other user interface components, for example various means for focusing a cursor (mouse, track ball, arrow keys, touch sensitive area etc.) or elements enabling audio control.

Naturally, the mobile apparatus 102 may include various other parts, such as a battery, a camera, a radio-frequency identifier reader, a positioning receiver, but as they are not needed to further illustrate the example embodiments, they will not be further described.

The computing resource 112 comprises a communication interface 216, a memory interface 218, one or more processors 214, and one or more memories 210 including computer program code 212. In an example embodiment, the computing resource 112 is a computer, such as a single server computer or a cluster of computers, whereby the one or more processors 214 and the one or more memories 210 may be implemented by suitable processors, even in parallel or multicore embodiments, for example.

The communication interface 216 enables communication with other parts of the system, such as the communication 138 with the mobile apparatus 102, and the communication with the point of sale systems 122, 126. The communication interface 216 may be coupled with a communication network. The communication network may comprise a wired network, such as the Internet, and also a wireless system capable of communicating with the wireless transceiver 208 of the mobile apparatus 102. Consequently, the communication interface 216 utilizes either a wired network interface or a radio transceiver.

The memory interface 218 enables storage of data into a memory, and it may also comprise a database interface to a database. The memory/database coupled to the memory interface 218 may reside in the computing resource 112, or in another computer.

In an example embodiment, the term 'processor' 204, 214 refers to a physical device that is capable of processing data in a computer or other digital electronic device. Depending on the processing power needed, the mobile apparatus 102 and the computing resource 112 may each comprise several processors 204, 214 such as parallel processors or one or more multicore processors. A non-exhaustive list of implementation techniques for the processor 204, 214 includes, but is not limited to: logic components, standard integrated circuits, application-specific integrated circuits (ASIC), system-on-a-chip (SoC), application-specific standard products (ASSP), microprocessors, digital signal processors, special-purpose computer chips, and field-programmable gate arrays (FPGA).

In an example embodiment, the term 'memory' 200, 210 refers to a physical device that is capable of storing the computer program code 202, 212 and data on a temporary or permanent basis for use in a computer or other digital electronic device. In an example embodiment, the term 'memory' refers to working memory (also known as primary storage, main memory or internal storage) directly accessible to the processor 204, 214. In an example embodiment, the working memory may be implemented as a random-access memory (RAM), such as a dynamic RAM, DRAM.

Now that the basic structures of the mobile apparatus 102 and the computing resource 112 have been described, we may proceed in describing the dynamic interaction between the two.

First of all, the basic register process is performed. The one or more memories 200 and the computer program code 202 of the mobile apparatus 102 are configured to, with the one or more processors 204 of the mobile apparatus 102, cause the mobile apparatus 102 to register, with the user interface 206 and the wireless transceiver 208, the payment card 104 of the user 100 of the mobile apparatus 102, and a communication identifier addressing the wireless transceiver 208 and associated with the registered payment card 104, to an electronic service.

The electronic service may be implemented by the computing resource 112. The one or more memories 210 and the computer program code 212 of the computing resource 112 are configured to, with the one or more processors 214 of the computing resource 112, cause the computing resource 112 to receive, with the communication interface 216, a registration of the payment card 104 of the user 100 of the mobile apparatus 102, and a registration of a communication identifier addressing the wireless transceiver 208 of the mobile apparatus 102 and associated with the registration of the payment card 104, from the mobile apparatus 102, and store, with the memory interface 218, the registration of the payment card 104, and the registration of the communication identifier.

After the basic register process, as the customer 100 user his/her payment card 104 for payments 130, 134, information 132, 136 and packets 138 flow between the system actors.

The use of the payment card 104 for payments 130, 134 generates information. The one or more memories 210 and the computer program code 212 of the computing resource 112 are configured to, with the one or more processors 214 of the computing resource 112, cause the computing resource 112 to receive, with the communication interface 216, a plurality of transactions 132, 136 of the user 100, relating to payments 130, 134 with the payment card 104 of a plurality of trades of commodities between the user 100 and a plurality of various retailers 120, 124, and generate a plurality of packets 138, relating to the payments 130, 134 with the payment card 104, formed on the basis of the received plurality of the transactions 132, 136. In an example embodiment, the transactions 132, 136 come directly from the point of sale systems 122, 126, or via an intermediary such as a bank or another financial institution.

Furthermore, supplementary information is tied with the transaction. The one or more memories 210 and the computer program code 212 of the computing resource 112 are configured to, with the one or more processors 214 of the computing resource 112, cause the computing resource 112 to insert transaction information 220 relating to the payments 130, 134 and supplementary information 222 into the plurality of the packets 138, and transmit, with the communication interface 216, the plurality of the packets 138 to the mobile apparatus 102 addressed with the communication identifier. Transaction information 220 relating to the payments 130, 134 determines circumstances relating to the financial transaction, at least one of the following for example: date/time of the trade, location of the trade, sum of the trade, name of the retailer etc. In an example embodiment, the use of the payment card 104 for payments 130, 134 generates at least part of the transaction information 220. In an example embodiment, the use of the mobile apparatus 102 for payments 130, 134 from an account linked with the payment card 104 generates at least part of the transaction information 220.

Consequently, the mobile apparatus 102 receives transaction information 220, but enriched with the supplementary information 222. This combination creates a unique communication channel between the customer 100 and a plurality of the retailers 120, 124. The one or more memories 200 and the computer program code 202 of the mobile apparatus 102 are configured to, with the one or more processors 204 of the mobile apparatus 102, cause the mobile apparatus 102 to receive, with the wireless transceiver 208, a plurality of packets 138 relating to the payments 130, 134 with the payment card 104 of the plurality of the trades of various commodities between the user 100 and the plurality of the various retailers 120, 124, from the electronic service 112, extract from the received plurality of the packets 138 transaction information 220 relating to the payments 130, 134 and supplementary information 222, and communicate, with the user interface 206, the extracted transaction information 220 and the supplementary information 222 to the user 100.

Figure 3:
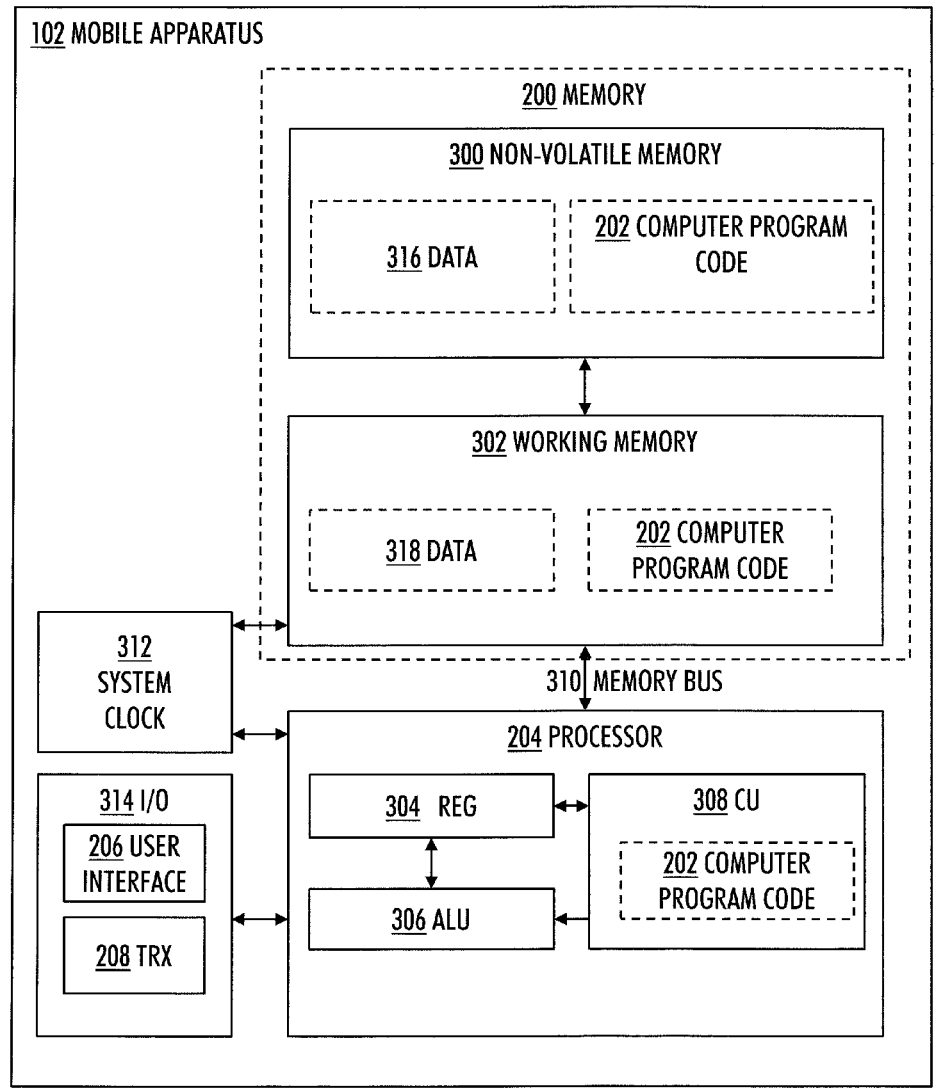
FIG. 3 illustrates an example embodiment of the mobile apparatus.

Let us next study FIG. 3 illustrating an example embodiment of the mobile apparatus 102. The mobile apparatus 102 may include an electronic digital computer, which may comprise a non-volatile memory 300 and a working memory 302 as the memory 200, the processor 204, a system clock 312 and an input/output 314 including the user interface 206 and the wireless transceiver 208. Naturally, the computer may comprise a number of other peripheral devices, not illustrated here for the sake of clarity. Also, the architecture of FIG. 3 is just one example embodiment as other feasible computing architectures may be utilized as well to implement the hardware and software of the mobile apparatus 102. It is also to be noted that the architecture of FIG. 3 may be applied as well, changing those things which need to be changed, to the implementation of the computing resource 112 as a single computer or a cluster of computers.

In an example embodiment, the system clock 312 constantly generates a stream of electrical pulses, which cause the various transferring operations within the computer to take place in an orderly manner and with specific timing.

In an example embodiment, the processor 204 may be implemented as a microprocessor implementing functions of a central processing unit (CPU) on an integrated circuit. The CPU 204 is a logic machine executing the computer program code 202. The computer program code 202 may be coded as a computer program using a programming language, which may be a high-level programming language, such as C, C++, or Java, or a low-level programming language, such as a machine language, or an assembler. There are many ways to structure the computer program code 202. In an example embodiment, the operations of the computer program code 202 may be divided into functional modules, sub-routines, methods, classes, objects, applets, macros, etc., depending on the software design methodology and the programming language used. In modern programming environments, there are software libraries, i.e. compilations of ready-made functions, which may be utilized by the computer program code 202 for performing a wide variety of standard operations.

The CPU 204 may comprise a set of registers 304, an arithmetic logic unit (ALU) 306, and a control unit (CU) 308. The control unit 308 is controlled by the computer program code 202 transferred to the CPU 204 from the working memory 302. The working memory 302 is directly or indirectly connected to the CPU 204 via a memory bus 310 including two buses: an address bus and a data bus. The CPU 204 sends a memory address indicating the desired location of data 318 or computer program code 202 through the address bus, whereupon the CPU 204 reads or writes the data itself from/to the working memory 302 using the data bus.

The control unit 308 may contain a number of microinstructions for basic operations. The implementation of the microinstructions may vary, depending on the CPU design. The microprocessor 204 may also have an operating system (such as a general-purpose operating system), which may provide the computer program code 202 with system services. During running of the computer program code 202, the computer program code 202 or a part of it are transferred via the memory bus 310 from the working memory 302 into the control unit 308, wherein usually a portion of the computer program code 202 resides and controls the operation.

In an example embodiment, the non-volatile memory 300 retains the stored information even when not powered. Examples of non-volatile memory include read-only memory (ROM), flash memory, magnetic computer storage devices such as hard disk drives, and optical discs. As is shown in FIG. 3, the non-volatile memory 300 may store both data 316 and the computer program code 202.

An example embodiment provides a computer readable medium comprising the computer program code 202. Said computer program code 202, when executed on the mobile apparatus 102, causes the mobile apparatus 102 to perform the operations required to implement the described example embodiments. In an example embodiment, the computer program code 202 may be in source code form, object code form, or in some intermediate form. The computer-readable medium may comprise at least the following: any entity or device capable of carrying computer program code 202 to the mobile apparatus 102, a record medium, a computer memory, a read-only memory, an electrical carrier signal, a telecommunications signal, and a software distribution medium. In some jurisdictions, depending on the legislation and the patent practice, the computer-readable medium may not be the telecommunications signal. In an example embodiment, the computer-readable medium may be a non-transitory computer readable storage medium.

Figure 4:
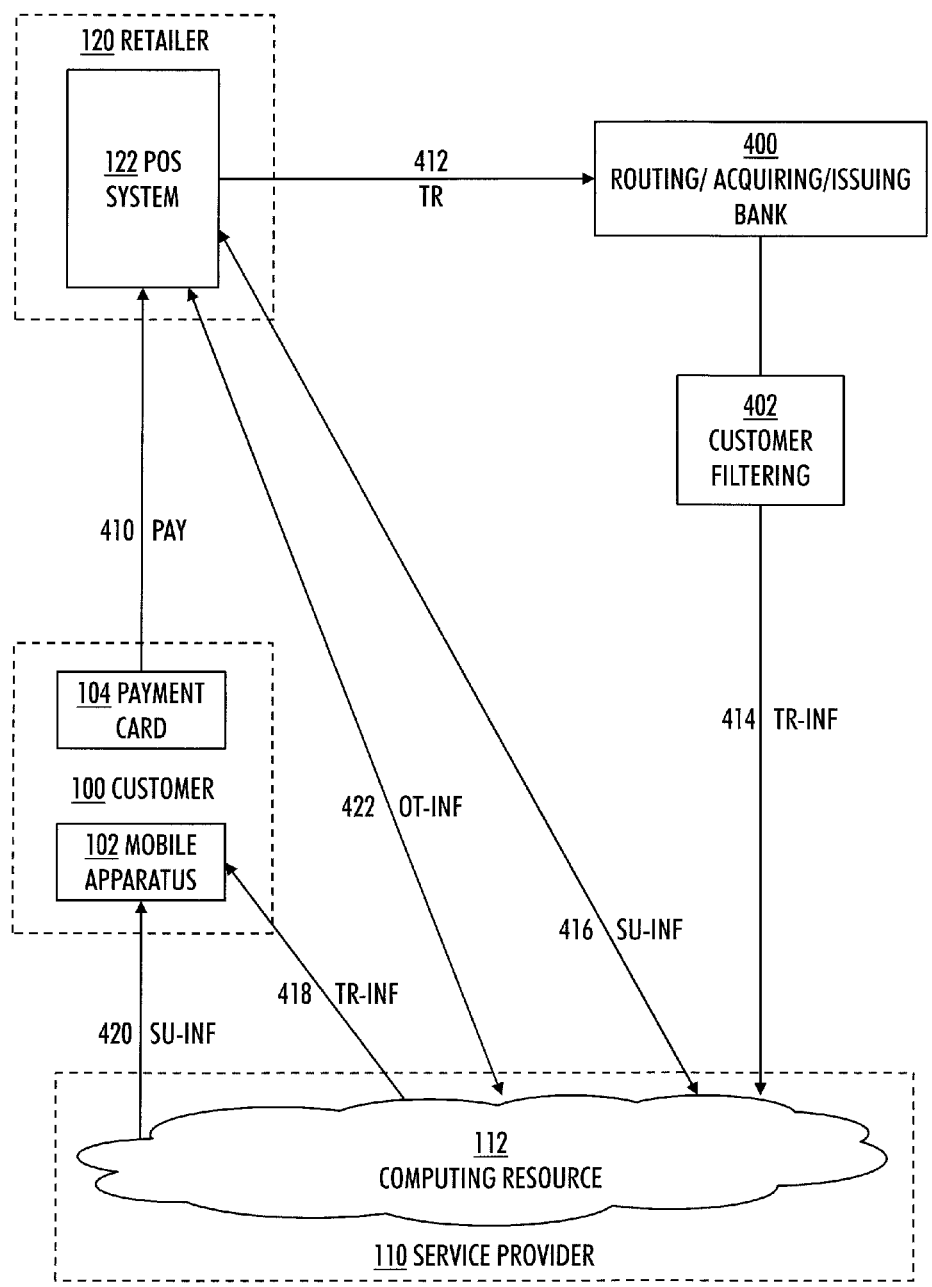
FIG. 4 illustrates an example embodiment of communication between the various actors.

Now that the basic communication sequence between the customer 100, service provider 110, and the retailers 120, 124 has been described with reference to FIG. 2, let us elaborate this. FIG. 4 illustrates an example embodiment of communication between the various actors.

The service provider 110 may be an application service provider, which provides the computer-based service with Internet hosting for both the customers 100 and retailers 120, 124. In an example embodiment, the service provider 110 is the applicant, OP-Pohjola Group, or some other financial institution.

As already explained, the customer 100 makes a payment 410 with his/her payment card 104 to the point of sale system 122 of the retailer 120.

The point of sale system 122 transmits the transaction(s) 412 to a routing/acquiring/issuing bank 400. As the role of the bank is not very important, the complex structure is depicted with a single entity 400, although the situation may in reality be quite complex. The acquiring bank processes the credit or debit card 104 payments 410 for the commodities, and it acquires credit card payment from the card-issuing banks within an association. The issuing bank offers the (possibly card association branded) payment cards 104 to the consumers 100, and it issues the payment to the acquiring bank on behalf of the consumer 100. Well-known card associations include Visa, MasterCard, American Express, and Diners Club, for example. It is also to be noted that the integration grade between the computing resource 112 and the routing/acquiring/issuing bank 400 may change: every element may be a separate actor, or one or more elements may be combined to a multi-actor element.

In the example embodiment of FIG. 4, a customer filtering function 402 filters in such transactions 412 that relate to a customer 100 and/or retailer 120 participating in the system. The filtered in transactions 414 are conveyed to the computing resource 112. The computing resource 112 may receive at least part of the supplementary information 416 from the point of sale system 122 of the retailer 120. Alternatively, or additionally, a part of the supplementary information may be maintained within the computing resource 112, or it may be received from another service such as a retailer portal. Also other information 422 may be exchanged between the point of sale system 122 and the computing resource 112.

The transaction information relating to the payments and the supplementary information of a plurality of trades may be transmitted from the computing resource 112 to the mobile apparatus 102 in a plurality of packets 138. The packet 138 may include control information and the actual payload. The term "packet" also includes the possibility that messages are used, i.e., the data is divided into messages, which, in turn, are transported by the packets.

Relating to each single trade, the transaction information and the supplementary information may be combined into a single packet flow 138, or, as illustrated in FIG. 4, the transaction information packet 418 and the supplementary information packet 420 may be separate packet flows.

The sequence of packets 138, 418, 420 between the computing resource 112 and the mobile apparatus 102 may be implemented in various ways. In an example embodiment, the packets 138 are network originated. In an example embodiment, the basic transaction information is transmitted in a push notification from the computing resource 112 to the mobile apparatus 102, whereupon the mobile apparatus 102 may fetch the supplementary information from the computing resource 112, as a download from a specific web site, for example. The push mechanism relieves both the mobile apparatus 102 (polling message) and the computing resource 112 (response message to the polling message) from the polling, which saves computing and radio resources, and also the battery of the mobile apparatus 102.

The supplementary information may be combined with the receipt. In a way, the receipt becomes an enhanced communication medium as, besides the transaction information relating to the payment 130, 134, also supplementary information is carried to the mobile apparatus 102 and presented to its user 100.

Finally, let us study several example embodiments, which illustrate various use cases, i.e., helpful ways to enhance the communication between the customer 100 and the retailers 120, 124. These example embodiments also serve to illustrate the nature of the supplementary information. Naturally, the list of the example embodiments is non-exhaustive, as the supplementary information may include also other kind of information, typically transaction-related.

Figure 6:
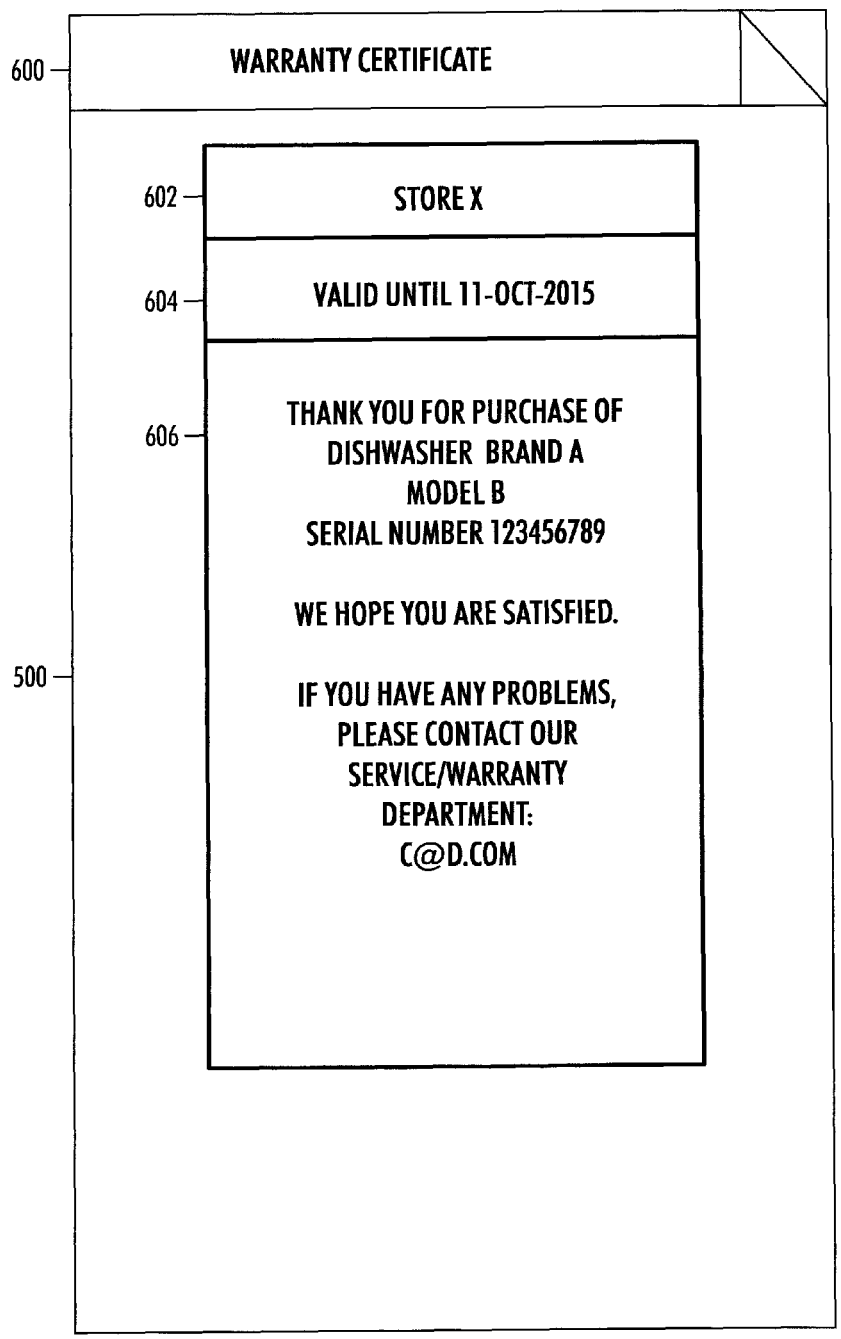
FIG. 6 illustrates an example embodiment relating to processing of a warranty certificate.

In an example embodiment of FIG. 6, the supplementary information 222 comprises a warranty certificate 600. The one or more memories 210 and the computer program code 212 of the computing resource 112 are configured to, with the one or more processors 214 of the computing resource 112, cause the computing resource 112 to receive, with the communication interface 216, a warranty certificate of the traded commodity issued by the retailer 120, and insert the warranty certificate into the packets 138. The one or more memories 200 and the computer program code 202 of the mobile apparatus 102 are configured to, with the one or more processors 204 of the mobile apparatus 102, cause the mobile apparatus 102 to extract from the received packets 138 a warranty certificate 600 of the traded commodity issued by the retailer 120, and store the warranty certificate 600 in a memory coupled with the mobile apparatus 102, and/or into a memory accessible through the wireless transceiver 208.

In FIG. 6, the warranty certificate 600 is displayed on the display 500 of the mobile apparatus 102. The transaction information 220 includes the name of the retailer 602. The supplementary information 222 includes information 604 on the warranty period. Field 606 displays other supplementary information 222 relating to the warranty such as the contact information of the service/warranty department. Furthermore, the field 606 displays other transaction information 220 such as the name, model and serial number of the product. Naturally, the supplementary information 222 may also comprise other information relating to the trade and the warranty.

Figure 7:
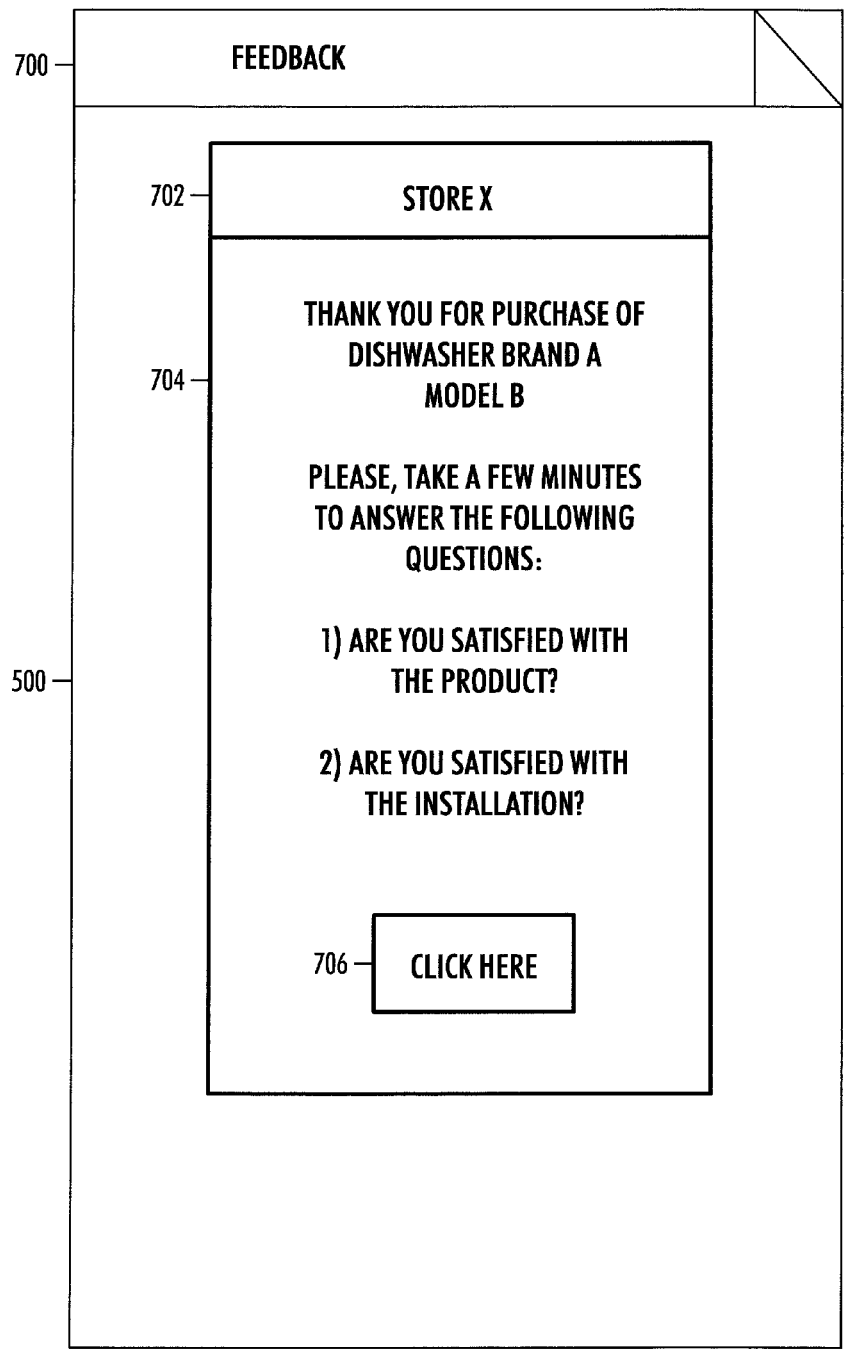
FIG. 7 illustrates an example embodiment relating to processing of a customer feedback form.

In an example embodiment of FIG. 7, the supplementary information 222 comprises a customer feedback form 700. The one or more memories 210 and the computer program code 212 of the computing resource 112 are configured to, with the one or more processors 214 of the computing resource 112, cause the computing resource 112 to receive, with the communication interface 216, a customer feedback form 700 of the traded commodity provided by the retailer 120, insert the customer feedback form 700 into the packets 138, receive, with the communication interface 216, the filled customer feedback form filled with the user 100 input from the mobile apparatus 102, and provide, with the communication interface 216, the filled customer feedback form to the retailer 120 of the traded commodity. The one or more memories 200 and the computer program code 202 of the mobile apparatus 102 are configured to, with the one or more processors 204 of the mobile apparatus 102, cause the mobile apparatus 102 to extract from the received packets 138 a customer feedback form 700 of the traded commodity provided by the retailer 120, fill, with the user interface 206, the customer feedback form with user 100 input, and transmit, with the wireless transceiver 208, the filled customer feedback form to the electronic service 112.

In FIG. 7, the customer feedback form 700 is displayed on the display 500 of the mobile apparatus 102. The transaction information 220 includes the name of the retailer 702. Field 704 displays other supplementary information 222 relating to the trade such as a short summary of the feedback questions. Furthermore, the field 704 displays other transaction information 220 such as the name and model of the product. Naturally, the supplementary information 222 may also comprise other information relating to the trade and the customer feedback. In our example embodiment, the complete questions of the feedback form to be filled are opened by clicking the button 706.

Figure 8:
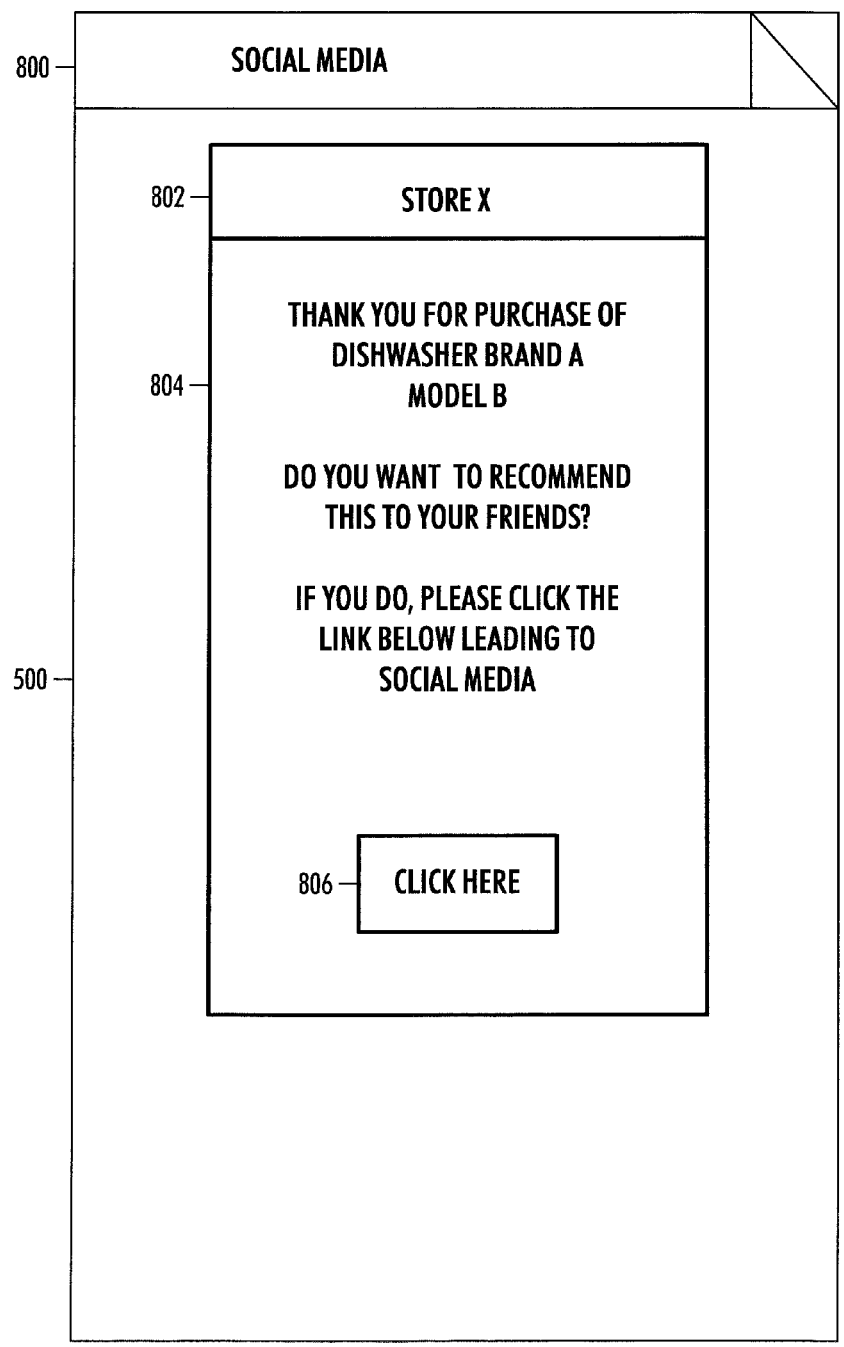
FIG. 8 illustrates an example embodiment relating to processing of an action to be performed in social media.

In an example embodiment of FIG. 8, the supplementary information comprises a link 806. The one or more memories 210 and the computer program code 212 of the computing resource 112 are configured to, with the one or more processors 214 of the computing resource 112, cause the computing resource 112 to receive, with the communication interface 216, a link 806 pointing to an action to be performed in social media relating to the retailer 120 of the traded commodity, and insert the link 806 into the packets 138. The one or more memories 200 and the computer program code 202 of the mobile apparatus 102 are configured to, with the one or more processors 204 of the mobile apparatus 102, cause the mobile apparatus 102 to extract from the received packets 138 a link 806 pointing to an action to be performed in social media relating to the retailer 120 of the traded commodity, and perform, with the user interface 206 and the wireless transceiver 208, the action pointed by the link 806 in the social media.

In FIG. 8, the social media 800 information is displayed on the display 500 of the mobile apparatus 102. The transaction information 220 includes the name of the retailer 802. Field 804 displays other supplementary information 222 relating to the social media such as the suggestion to recommend the purchased product to a friend. Furthermore, the field 804 displays other transaction information 220 such as the name and model of the product. Naturally, the supplementary information 222 may also comprise other information relating to the trade and the social media, such as the link 806 to the social media.

Figure 9:
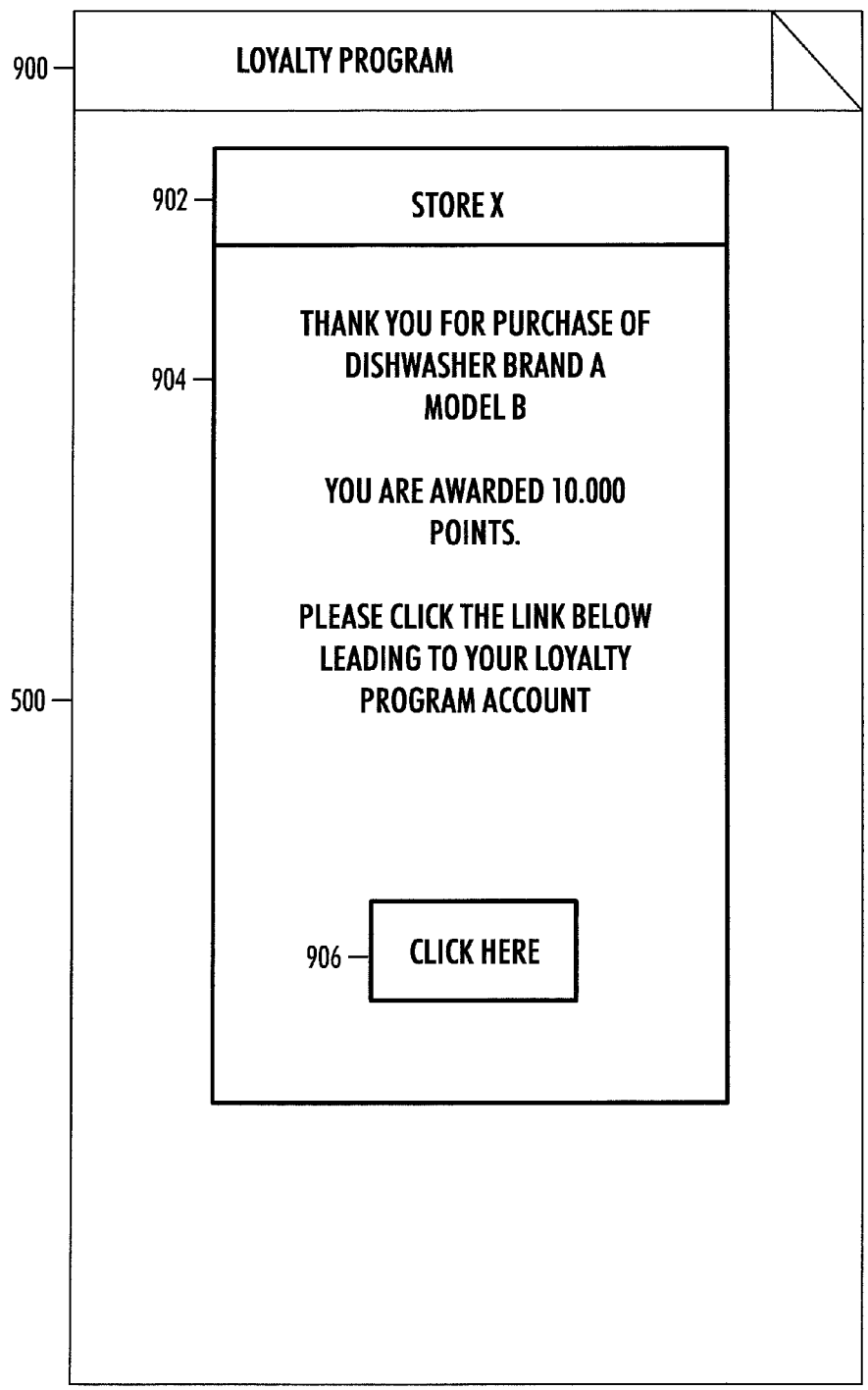
FIG. 9 illustrates an example embodiment relating to processing of loyalty program data.

In an example embodiment of FIG. 9, the supplementary information comprises a loyalty program note 900. The one or more memories 210 and the computer program code 212 of the computing resource 112 are configured to, with the one or more processors 214 of the computing resource 112, cause the computing resource 112 to receive, with the communication interface 216, a loyalty program note 900 from a loyalty program maintained by the retailer 120 of the traded commodity, and insert the loyalty program note 900 into the packets 138. The one or more memories 200 and the computer program code 202 of the mobile apparatus 102 are configured to, with the one or more processors 204 of the mobile apparatus 102, cause the mobile apparatus 102 to register, with the user interface 206 and the wireless transceiver 208, into a loyalty program maintained by the retailer 120 of the traded commodity, and extract from the received packets 138 a loyalty program note 900 relating to the retailer 120 of the traded commodity within the registered loyalty program.

In FIG. 9, the loyalty program note 900 is displayed on the display 500 of the mobile apparatus 102. The transaction information 220 includes the name of the retailer 902. Field 904 displays other supplementary information 222 relating to the loyalty program such as the number of earned bonus points of the loyalty program. Furthermore, a link 906 leading to the loyalty program account is displayed as the supplementary information 222. The field 904 also displays other transaction information 220 such as the name and model of the product. Naturally, the supplementary information 222 may also comprise other information relating to the trade and the loyalty program.

The loyalty program refers to a structured marketing effort rewarding loyal buying behavior. In an example embodiment, a loyalty card (also known as a rewards card, points card, advantage card, or club card) is provided for the customer 100 in connection with the loyalty program. The loyalty card may be a plastic or paper card, visually similar to a credit card or debit card, identifying the card holding customer 100 as a member in the loyalty program. However, the loyalty card may also be in electronic format, existing only virtually in the mobile apparatus 102 and/or in the computing resource 112. By presenting the loyalty card, the customer 100 may be entitled to either a discount on the current purchase, or an allotment of points that can be used for future purchases, or a rebate for a future purchase (e.g. a so-called rebound coupon). The loyalty program note 900 may include supplementary information 222 relating to the present status of the loyalty program such as discount or points information, or a rebound coupon, for example.

Figure 10:
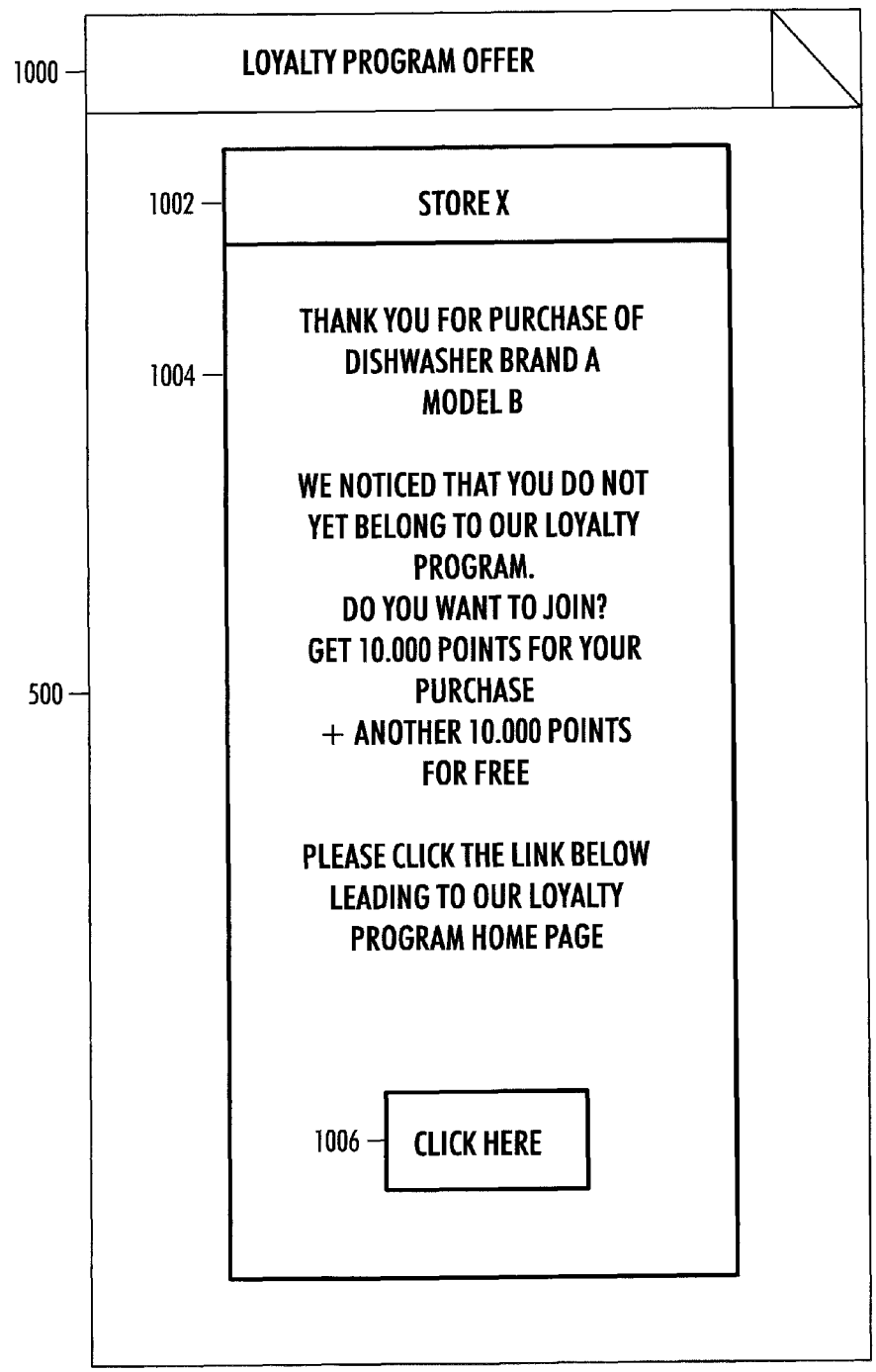
FIG. 10 illustrates an example embodiment relating to processing of a loyalty program join offer.

In an example embodiment of FIG. 10, the supplementary information 222 comprises a loyalty program join offer 1000. The one or more memories 210 and the computer program code 212 of the computing resource 112 are configured to, with the one or more processors 214 of the computing resource 112, cause the computing resource 112 to recognize among the received plurality of the transactions 414 such a lacking retailer 120, 124 to whose loyalty program the user 100 does not yet belong to, insert a loyalty program join offer 1000 of the lacking retailer into the packets 138, receive, with the communication interface 216, a registration, on the basis of the loyalty program join offer 1000, into the loyalty program maintained by the retailer 120, 124, from the mobile apparatus 102, and provide, with the communication interface 216, the registration into the loyalty program to the retailer 120, 124. The one or more memories 200 and the computer program code 202 of the mobile apparatus 102 are configured to, with the one or more processors 204 of the mobile apparatus 102, cause the mobile apparatus 102 to extract from the received packets 138 a loyalty program join offer 1000 relating to the retailer 120, 124 of the traded commodity, and register, with the user interface 206 and the wireless transceiver 208, on the basis of the loyalty program join offer 1000, into the loyalty program maintained by the retailer 120, 124 of the traded commodity.

In FIG. 10, the loyalty program offer 1000 is displayed on the display 500 of the mobile apparatus 102. The transaction information 220 includes the name of the retailer 1002. Field 1004 displays other supplementary information 222 relating to the loyalty program offer such as the offer of the bonus points for the loyalty program. Furthermore, a link 1006 leading to the loyalty program home page is displayed as the supplementary information 222. The field 1004 also displays other transaction information 220 such as the name and model of the product. Naturally, the supplementary information 222 may also comprise other information relating to the trade and the loyalty program.

Figure 11:
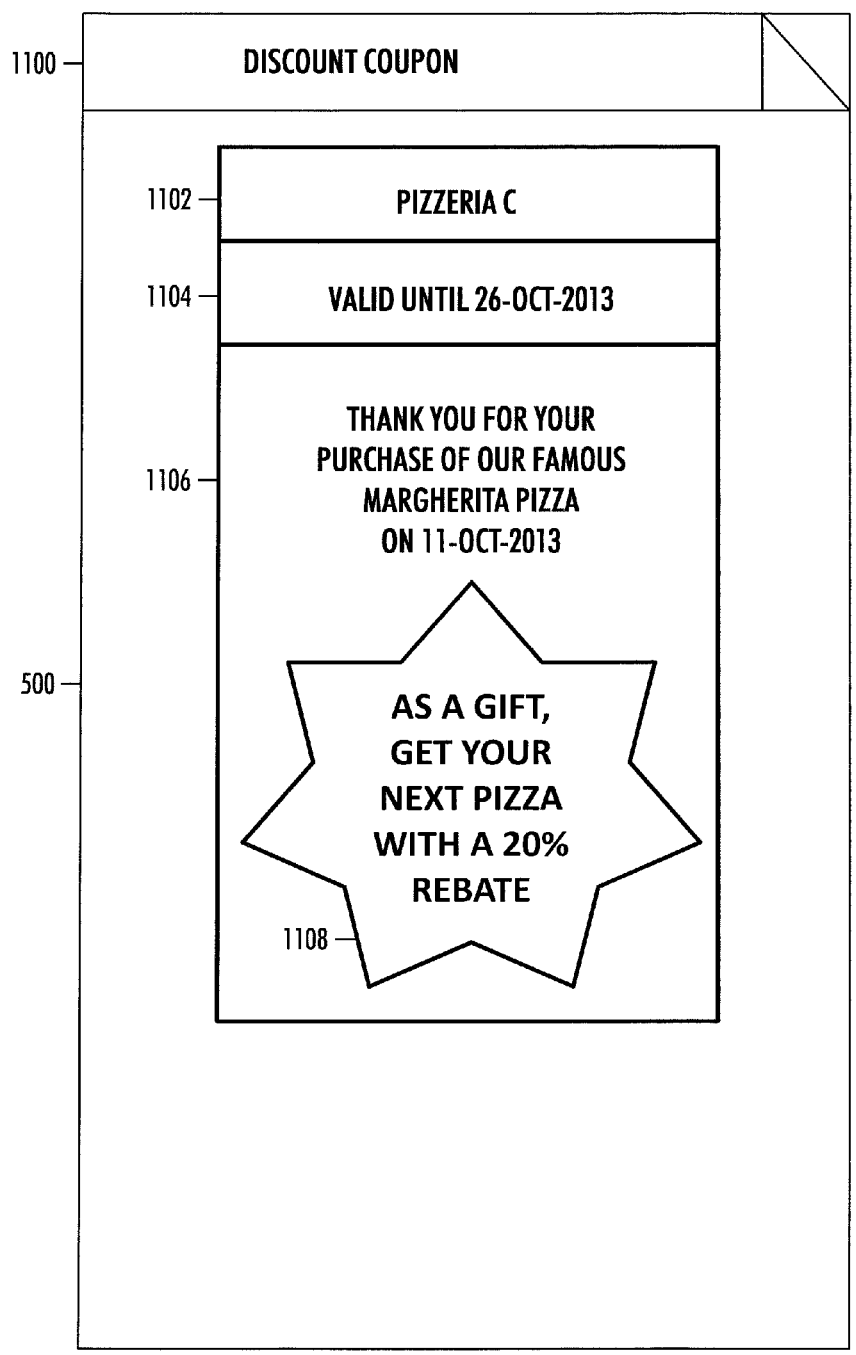
FIGS. 11 and 12 illustrate example embodiments relating to processing of a virtual discount coupon.
Figure 12:
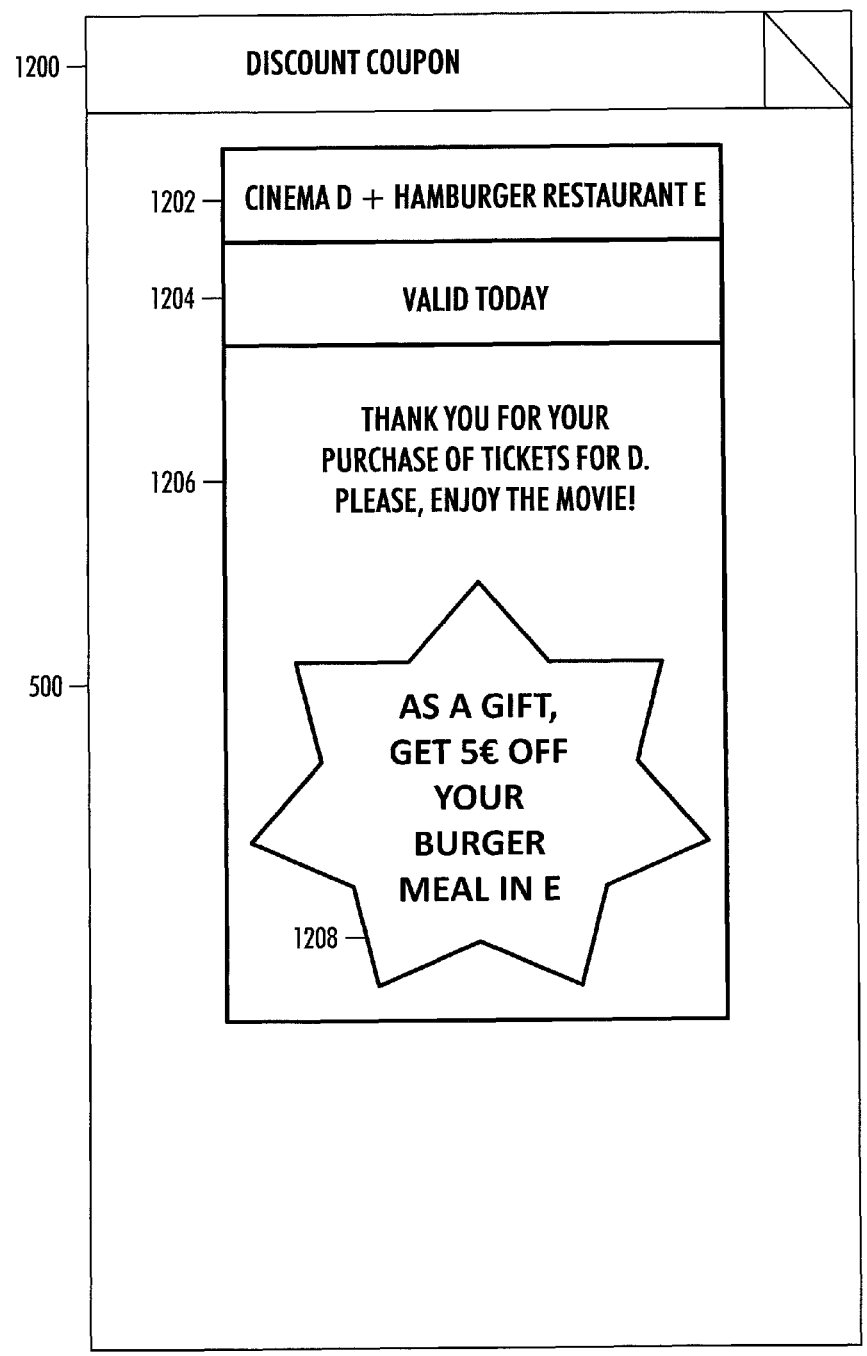

Next, FIGS. 11 and 12 illustrate example embodiments relating to processing of a virtual discount coupon.

In an example embodiment of FIG. 11, the supplementary information 222 comprises a virtual discount coupon 1100. The one or more memories 210 and the computer program code 212 of the computing resource 112 are configured to, with the one or more processors 214 of the computing resource 112, cause the computing resource 112 to generate a virtual discount coupon 1100 on the basis of the transaction information such that the virtual discount coupon 1100 is good for a predetermined period of time for purchasing a commodity from the retailer, and insert the virtual discount coupon 1100 into the packets 138. The one or more memories 200 and the computer program code 202 of the mobile apparatus 102 are configured to, with the one or more processors 204 of the mobile apparatus 102, cause the mobile apparatus 102 to extract from the received packets 138 a virtual discount coupon 1100 generated on the basis of the trade with the retailer such that the virtual discount coupon 1100 is good for a predetermined period of time for purchasing a commodity from the retailer, and output, with the user interface 206, the virtual discount coupon 1100.

In FIG. 11, the virtual discount coupon 1100 is displayed on the display 500 of the mobile apparatus 102. The transaction information 220 includes the name of the retailer 1102. The supplementary information 222 includes information 1104 on the validity period of the virtual discount coupon. Field 1106 displays other transaction information 220 such as the name and purchase date of the commodity. Symbol 1108 includes the supplementary information 222 informing the user of the amount of the discount for the next purchase. Naturally, the supplementary information 222 may also comprise other information relating to the trade and the virtual discount coupon. This example embodiment provides a simple way of implementing the virtual discount coupon 1100, without a need to scan a QR (Quick Response) code or the like.

In an example embodiment of FIG. 12, the supplementary information 222 also comprises a virtual discount coupon 1200, but the difference to FIG. 11 is that in FIG. 11 the virtual discount coupon 1100 is for the next purchase from the same retailer (PIZZERIA C), whereas in FIG. 12 the virtual discount coupon 1200 is earned on the basis of the purchase from the first retailer (CINEMA D) to the purchase from the second retailer (HAMBURGER RESTAURANT E). Accordingly, the one or more memories 210 and the computer program code 212 of the computing resource 112 are configured to, with the one or more processors 214 of the computing resource 112, cause the computing resource to generate a virtual discount coupon 1200 on the basis of the transaction information such that the virtual discount coupon 1200 is good for a predetermined period of time for purchasing a commodity from a retailer other than to which the transaction relates to, and insert the virtual discount coupon 1200 into the packets 138. The one or more memories 200 and the computer program code 202 of the mobile apparatus 102 are configured to, with the one or more processors 204 of the mobile apparatus 102, cause the mobile apparatus 102 to extract from the received packets 138 a virtual discount coupon 1200 on the basis of the trade with the retailer such that the virtual discount coupon 1200 is good for a predetermined period of time for purchasing a commodity from a retailer other than to which the transaction relates to, and output, with the user interface 206, the virtual discount coupon 1200.

In FIG. 12, the virtual discount coupon 1200 is displayed on the display 500 of the mobile apparatus 102. The transaction information 220 includes the name of the retailer 1202 (CINEMA D), but, as shown, the name of the other retailer (HAMBURGER RESTAURANT E) may also be shown as a part of the supplementary information 222. The supplementary information 222 includes information 1204 on the validity period of the virtual discount coupon 1200. Field 1206 displays other transaction information 220 relating to the purchase of the commodity. Symbol 1208 includes the supplementary information 222 informing the user of the amount of the discount for the purchase from the other retailer. Naturally, the supplementary information 222 may also comprise other information relating to the trade and the virtual discount coupon. This example embodiment nurtures trading of commodities within a network of retailers, such as retailers within a specific shopping center, for example. This example embodiment utilizes the (almost) real-time connection to the mobile apparatus 102 after the purchase of the commodity, whereby the virtual discount coupon 1200 arrives just in time, i.e., while the user is still in the shopping center so that the virtual discount coupon incites the user for an immediate purchase from the other retailer.

Figure 13:
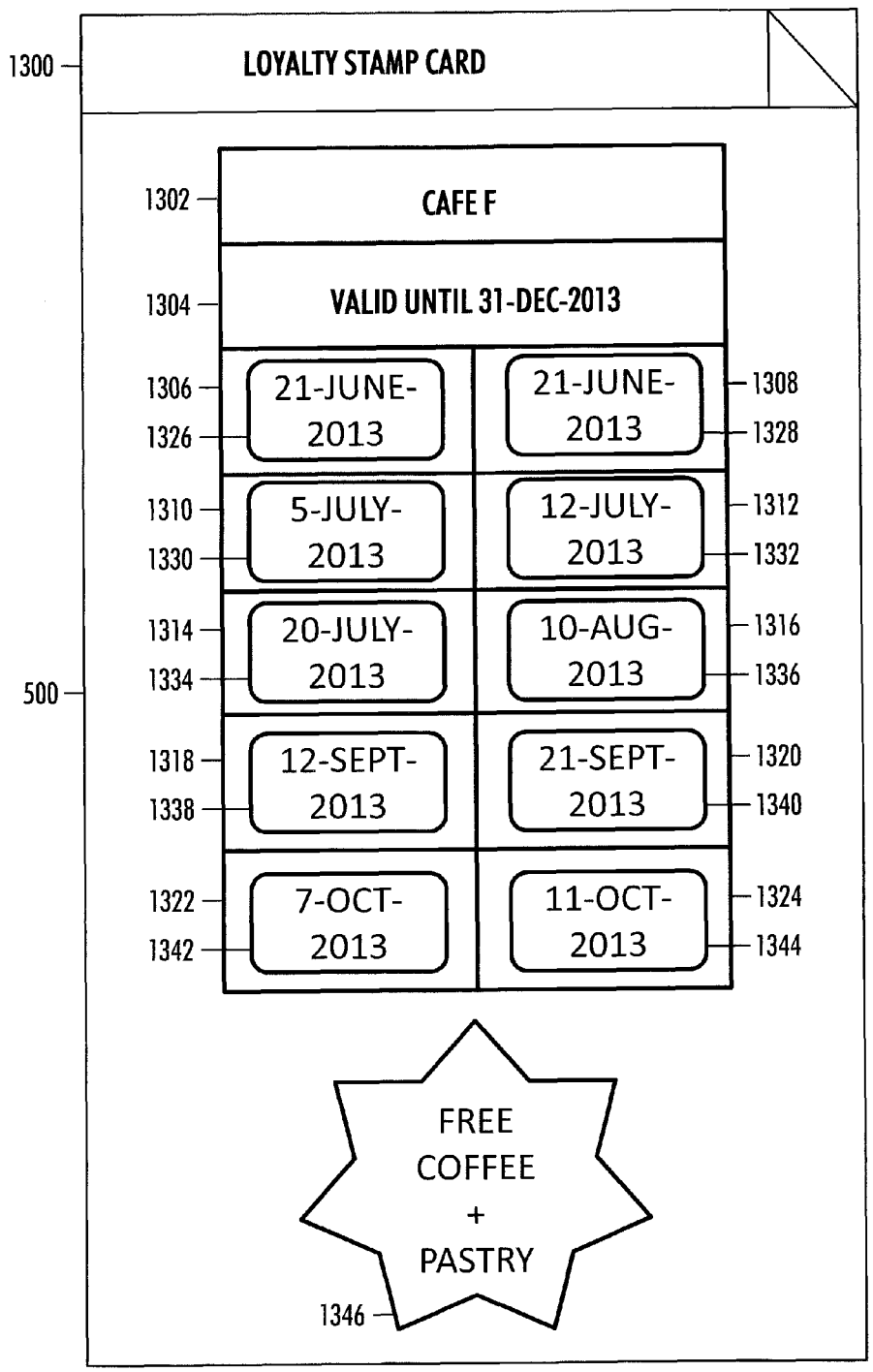
FIG. 13 illustrates an example embodiment relating to processing of an event for a loyalty program.

FIG. 13 illustrates an example embodiment relating to processing of an event for a loyalty program. In an example embodiment of FIG. 13, the supplementary information 222 comprises an event for a loyalty program. The one or more memories 210 and the computer program code 212 of the computing resource 112 are configured to, with the one or more processors 214 of the computing resource 112, cause the computing resource 112 to generate an event for a loyalty program on the basis of the transaction information such that the event comprises a virtual stamp on a virtual loyalty card 1300 of the retailer, and insert the loyalty program event into the packets 138. The one or more memories 200 and the computer program code 202 of the mobile apparatus 102 are configured to, with the one or more processors 204 of the mobile apparatus 102, cause the mobile apparatus 102 to extract from the received packets 138 an event for a loyalty program on the basis of the trade with the retailer such that the event comprises a virtual stamp on a virtual loyalty card 1300 of the retailer, and output, with the user interface 206, the loyalty program event.

In FIG. 13, the loyalty stamp card 1300 is displayed on the display 500 of the mobile apparatus 102. The transaction information 220 includes the name of the retailer 1302. The supplementary information 222 includes information 1304 on the validity period of the loyalty stamp card. Fields 1306, 1308, 1310, 1312, 1314, 1316, 1318, 1320, 1322 and 1324 are supplementary information 222 forming ten slots. Accordingly, stamps 1326, 1328, 1330, 1332, 1334, 1336, 1338, 1340, 1342 and 1344 are transaction information filling the slots as the results of the purchases on the shown dates. Symbol 1346 is supplementary information 222 informing the user of the gift obtained with the fully stamped card 1300. Naturally, the supplementary information 222 may also comprise other information relating to the trade and the loyalty stamp card 1300.

Figure 14:
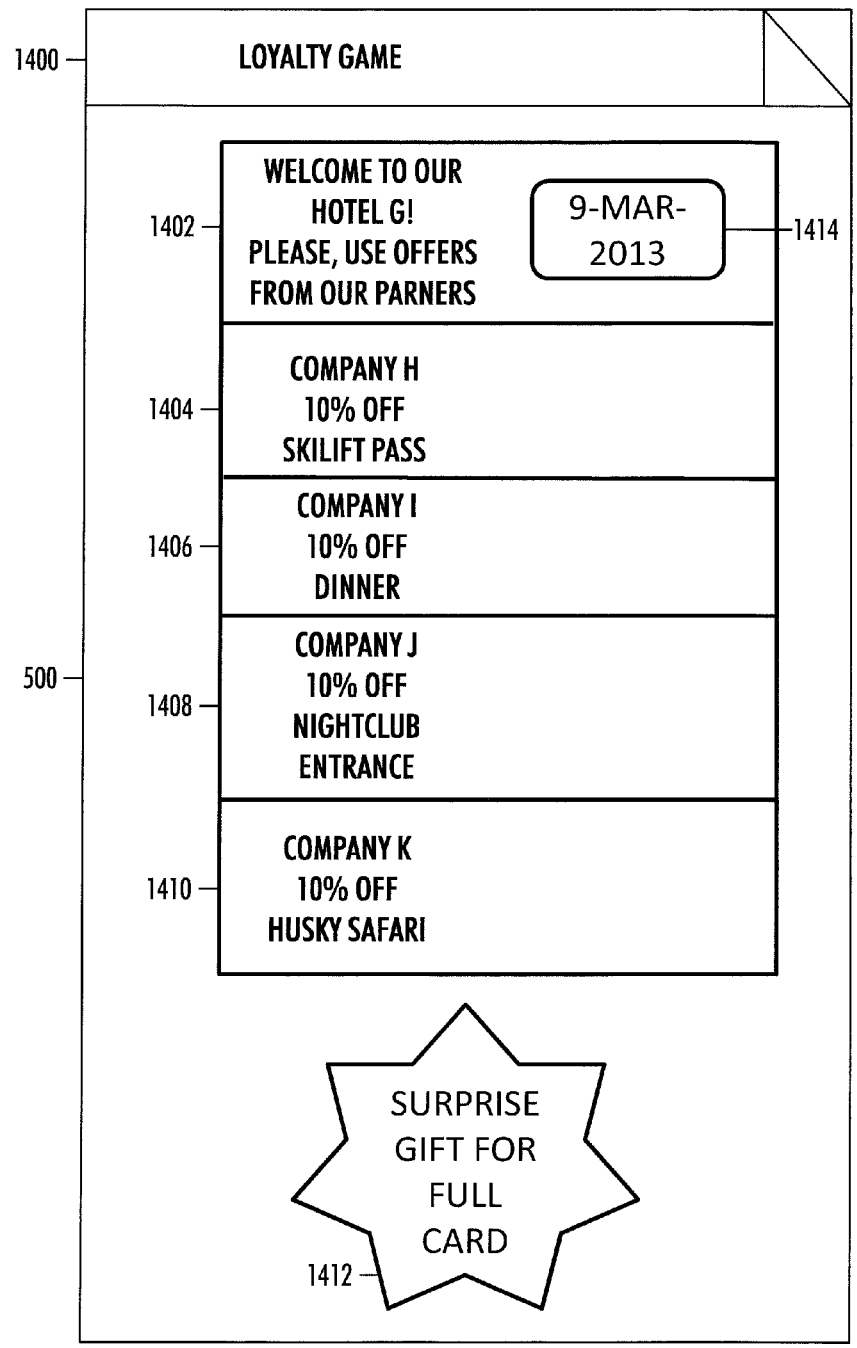
FIGS. 14 and 15 illustrate example embodiments relating to processing of an interactive loyalty game.
Figure 15:
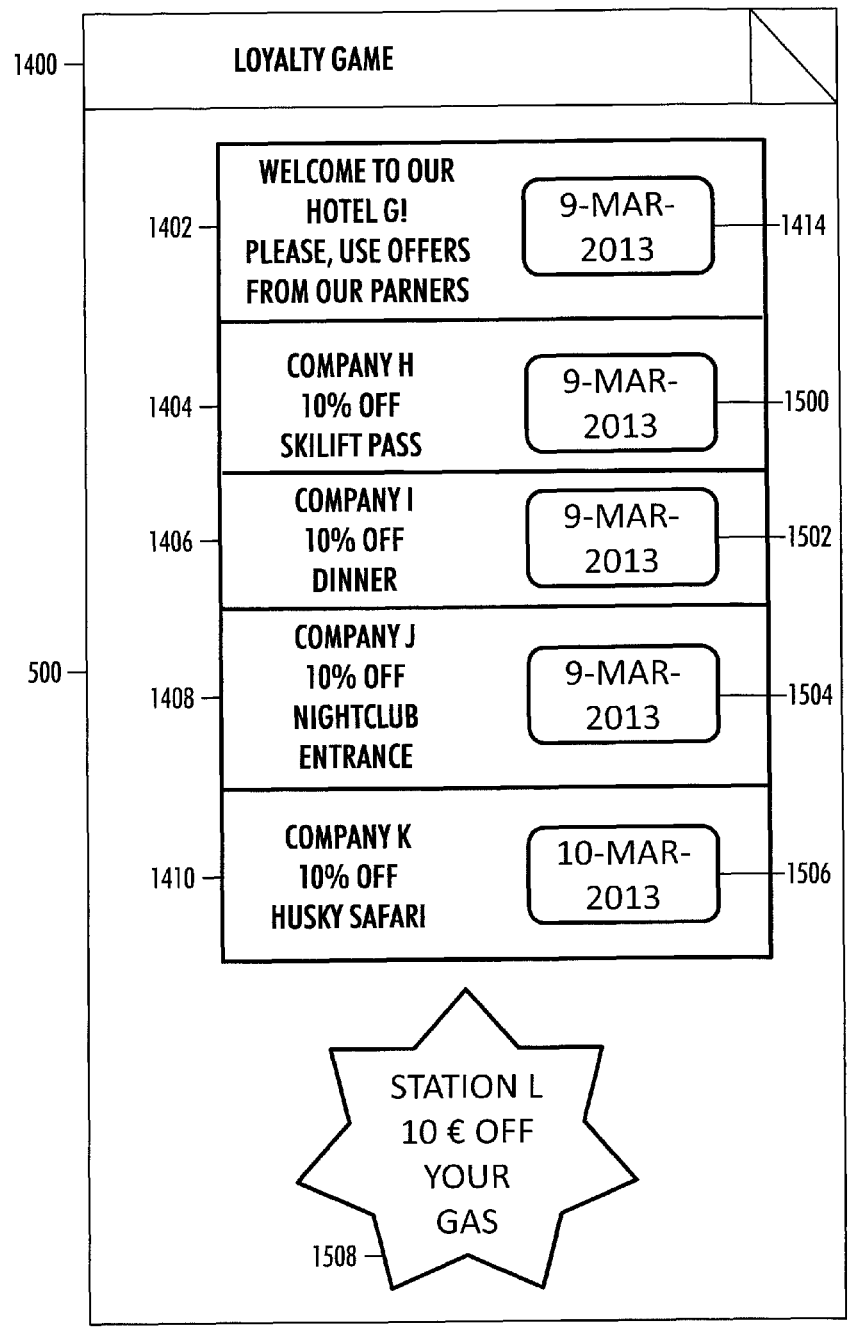

FIGS. 14 and 15 illustrate example embodiments relating to processing of an interactive loyalty game.

In an example embodiment of FIG. 14, the supplementary information 222 comprises an interactive loyalty game 1400. The one or more memories 210 and the computer program code 212 of the computing resource 112 are configured to, with the one or more processors 214 of the computing resource 112, cause the computing resource 112 to generate an event for a loyalty program on the basis of the transaction information such that the event belongs to a chain of past recorded and future planned events, the chain of events constituting an interactive loyalty game rewarding the user for performing trades belonging to the chain of events, and insert the loyalty program event into the packets 138. The one or more memories 200 and the computer program code 202 of the mobile apparatus 102 are configured to, with the one or more processors 204 of the mobile apparatus 102, cause the mobile apparatus 102 to extract from the received packets 138 an event for a loyalty program on the basis of the trade with the retailer such that the event belongs to a chain of past recorded and future planned events, the chain of events constituting an interactive loyalty game 1400 rewarding the user for performing trades belonging to the chain of events, and output, with the user interface 206, the loyalty program event.

In FIG. 14, the loyalty game 1400 is displayed on the display 500 of the mobile apparatus 102. The transaction information 220 includes the name of the first retailer 1402. The supplementary information 222 includes information 1414 on the first purchase, such as the date stamp, launching the loyalty game 1400. Fields 1404, 1406, 1408 and 1410 are supplementary information 222 indicating the next four purchases that need to be made in order to advance in the game. In FIG. 14, the date stamp 1414 on the field 1402 becomes the first past recorded event, and the fields 1404, 1406, 1408 and 1410 are shown as the future planned events.

Symbol 1412 is supplementary information 222 informing the user of a surprise gift obtained if all previous purchases are made. Naturally, the supplementary information 222 may also comprise other information relating to the trade and the loyalty game 1400.

FIG. 15 illustrates the final stages of the loyalty game 1400. The user arrived at the ski resort on the 9 of Mar. 2013 and checked in the hotel thereby starting the loyalty game 1400 and gaining the first date stamp 1414. In the following days, the user followed the game plan and used the services provided by the ski lift operator, restaurant, nightclub and husky safari tour operator, thereby gaining the missing date stamps 1500, 1502, 1504, 1506. Besides obtaining discounts, in our example embodiment 10%, the user obtains a surprise gift for completing the game, in our example embodiment 10€ off the gas from service station L. The 10€ rebate may be provided by the service station L by its own, or as a joint effort from all the companies that participated in the loyalty game 1400.

Note that FIGS. 14 and 15 only illustrate a very simple loyalty game 1400 scheme. Depending on the game design, it may be more complicate. The loyalty game 1400 may include hidden elements, which only become visible if the first phases of the game plan are followed. Furthermore, the game design may include varying routes: for example, the first purchases may indicate the users preference to certain kind of activities, whereupon the offers belonging to the loyalty game 1400 are tailored to meet those preferences. For example, in FIG. 14 it is supposed that the person likes physical activities. However, if it is found out or known beforehand that the user prefers culture or lighter physical activities, another choice or choice between different sequences of events may be presented.

It is also to be noted that the loyalty game 1400 of FIGS. 14 and 15 includes various retailers. However, also such an example embodiment is feasible wherein a single retailer implements the loyalty game 1400: the various stages may include various departments and/or locations of the retailer, for example.

It will be obvious to a person skilled in the art that, as technology advances, the inventive concept can be implemented in various ways. The invention and its embodiments are not limited to the example embodiments described above but may vary within the scope of the claims.

The invention claimed is:

1. A mobile apparatus comprising
a wireless transceiver,
a user interface,
one or more processors, and
one or more memories including computer program code, the one or more memories and the computer program code configured to, with the one or more processors, cause the mobile apparatus at least to perform:
register, with the user interface and the wireless transceiver, a payment card of a user of the mobile apparatus, and a communication identifier addressing the wireless transceiver and associated with the registered payment card, to an electronic service;
receive, with the wireless transceiver, a plurality of packets relating to payments with the payment card of a plurality of trades of various commodities between the user and a plurality of various retailers, from the electronic service;
extract from the received plurality of the packets transaction information relating to the payments and supplementary information;
communicate, with the user interface, the extracted transaction information and the supplementary information to the user;
extract from the received packets a link pointing to an action to be performed in social media relating to the retailer of the traded commodity; and
perform, with the user interface and the wireless transceiver, the action pointed by the link in the social media.

2. The mobile apparatus of claim 1, wherein the one or more memories and the computer program code are further configured to, with the one or more processors, cause the mobile apparatus further to perform:
extract from the received packets a warranty certificate of the traded commodity issued by the retailer; and
store the warranty certificate in a memory coupled with the mobile apparatus, and/or into a memory accessible through the wireless transceiver.

3. The mobile apparatus of claim 1, wherein the one or more memories and the computer program code are further configured to, with the one or more processors, cause the mobile apparatus further to perform:
extract from the received packets a customer feedback form of the traded commodity provided by the retailer;
fill, with the user interface, the customer feedback form with user input; and
transmit, with the wireless transceiver, the filled customer feedback form to the electronic service.

4. The mobile apparatus of claim 1, wherein the one or more memories and the computer program code are further configured to, with the one or more processors, cause the mobile apparatus further to perform:
register, with the user interface and the wireless transceiver, into a loyalty program maintained by the retailer of the traded commodity; and
extract from the received packets a loyalty program note relating to the retailer of the traded commodity within the registered loyalty program.

5. The mobile apparatus of claim 1, wherein the one or more memories and the computer program code are further configured to, with the one or more processors, cause the mobile apparatus further to perform:
extract from the received packets a loyalty program join offer relating to the retailer of the traded commodity; and
register, with the user interface and the wireless transceiver, on the basis of the loyalty program join offer, into the loyalty program maintained by the retailer of the traded commodity.

6. The mobile apparatus of claim 1, wherein the one or more memories and the computer program code are further configured to, with the one or more processors, cause the mobile apparatus further to perform:
extract from the received packets a virtual discount coupon on the basis of the trade with the retailer such that the virtual discount coupon is good for a predetermined period of time for purchasing a commodity from a retailer other than to which the transaction relates to; and
output, with the user interface, the virtual discount coupon.

7. A mobile apparatus comprising
a wireless transceiver,
a user interface,
one or more processors, and
one or more memories including computer program code, the one or more memories and the computer program code configured to, with the one or more processors, cause the mobile apparatus at least to perform:
register, with the user interface and the wireless transceiver, a payment card of a user of the mobile apparatus, and a communication identifier addressing the wireless transceiver and associated with the registered payment card, to an electronic service;
receive, with the wireless transceiver, a plurality of packets relating to payments with the payment card of a plurality of trades of various commodities between the user and a plurality of various retailers, from the electronic service;
extract from the received plurality of the packets transaction information relating to the payments and supplementary information;
communicate, with the user interface, the extracted transaction information and the supplementary information to the user;
extract from the received packets a virtual discount coupon generated on the basis of the trade with the retailer such that the virtual discount coupon is good for a predetermined period of time for purchasing a commodity from the retailer; and
output, with the user interface, the virtual discount coupon.

8. A mobile apparatus comprising
a wireless transceiver,
a user interface,
one or more processors, and
one or more memories including computer program code, the one or more memories and the computer program code configured to, with the one or more processors, cause the mobile apparatus at least to perform:

register, with the user interface and the wireless transceiver, a payment card of a user of the mobile apparatus, and a communication identifier addressing the wireless transceiver and associated with the registered payment card, to an electronic service;

receive, with the wireless transceiver, a plurality of packets relating to payments with the payment card of a plurality of trades of various commodities between the user and a plurality of various retailers, from the electronic service;

extract from the received plurality of the packets transaction information relating to the payments and supplementary information;

communicate, with the user interface, the extracted transaction information and the supplementary information to the user;

extract from the received packets an event for a loyalty program on the basis of the trade with the retailer such that the event comprises a virtual stamp on a virtual loyalty card of the retailer; and output, with the user interface, the loyalty program event.

9. A mobile apparatus comprising
a wireless transceiver,
a user interface,
one or more processors, and
one or more memories including computer program code, the one or more memories and the computer program code configured to, with the one or more processors, cause the mobile apparatus at least to perform:

register, with the user interface and the wireless transceiver, a payment card of a user of the mobile apparatus, and a communication identifier addressing the wireless transceiver and associated with the registered payment card, to an electronic service;

receive, with the wireless transceiver, a plurality of packets relating to payments with the payment card of a plurality of trades of various commodities between the user and a plurality of various retailers, from the electronic service;

extract from the received plurality of the packets transaction information relating to the payments and supplementary information;

communicate, with the user interface, the extracted transaction information and the supplementary information to the user;

extract from the received packets an event for a loyalty program on the basis of the trade with the retailer such that the event belongs to a chain of past recorded and future planned events, the chain of events constituting an interactive loyalty game rewarding the user for performing trades belonging to the chain of events; and output, with the user interface, the loyalty program event.

10. A computing resource comprising
a communication interface,
a memory interface,
one or more processors, and
one or more memories including computer program code,
the one or more memories and the computer program code configured to, with the one or more processors, cause the computing resource at least to perform:

receive, with the communication interface, a registration of a payment card of a user of a mobile apparatus, and a registration of a communication identifier addressing a wireless transceiver of the mobile apparatus and associated with the registration of the payment card, from the mobile apparatus;

store, with the memory interface, the registration of the payment card, and the registration of the communication identifier;

receive, with the communication interface, a plurality of transactions of the user, relating to payments with the payment card of a plurality of trades of commodities between the user and a plurality of various retailers;

generate a plurality of packets, relating to the payments with the payment card, formed on the basis of the received plurality of the transactions;

insert transaction information relating to the payments and supplementary information into the plurality of the packets;

transmit, with the communication interface, the plurality of the packets to the mobile apparatus addressed with the communication identifier;

receive, with the communication interface, a link pointing to an action to be performed in social media relating to the retailer of the traded commodity; and insert the link into the packets.

11. The computing resource of claim 10, wherein the one or more memories and the computer program code are further configured to, with the one or more processors, cause the computing resource further to perform:

receive, with the communication interface, a warranty certificate of the traded commodity issued by the retailer; and insert the warranty certificate into the packets.

12. The computing resource of claim 10, wherein the one or more memories and the computer program code are further configured to, with the one or more processors, cause the computing resource further to perform:

receive, with the communication interface, a customer feedback form of the traded commodity provided by the retailer;

insert the customer feedback form into the packets;

receive, with the communication interface, the filled customer feedback form filled with the user input from the mobile apparatus; and provide, with the communication interface, the filled customer feedback form to the retailer of the traded commodity.

13. The computing resource of claim 10, wherein the one or more memories and the computer program code are further configured to, with the one or more processors, cause the computing resource further to perform:

receive, with the communication interface, a loyalty program note from a loyalty program maintained by the retailer of the traded commodity; and insert the loyalty program note into the packets.

14. The computing resource of claim 10, wherein the one or more memories and the computer program code are further configured to, with the one or more processors, cause the computing resource further to perform:

recognize among the received plurality of the transactions such a lacking retailer to whose loyalty program the user does not yet belong to;

insert a loyalty program join offer of the lacking retailer into the packets;

receive, with the communication interface, a registration, on the basis of the loyalty program join offer, into the loyalty program maintained by the retailer, from the mobile apparatus; and provide, with the communication interface, the registration into the loyalty program to the retailer.

15. The computing resource of claim 10, wherein the one or more memories and the computer program code are further configured to, with the one or more processors, cause the computing resource further to perform:
  generate a virtual discount coupon on the basis of the transaction information such that the virtual discount coupon is good for a predetermined period of time for purchasing a commodity from a retailer other than to which the transaction relates to; and
  insert the virtual discount coupon into the packets.

16. A computing resource comprising
  a communication interface,
  a memory interface,
  one or more processors, and
one or more memories including computer program code,
  the one or more memories and the computer program code configured to, with the one or more processors, cause the computing resource at least to perform:
  receive, with the communication interface, a registration of a payment card of a user of a mobile apparatus, and a registration of a communication identifier addressing a wireless transceiver of the mobile apparatus and associated with the registration of the payment card, from the mobile apparatus;
  store, with the memory interface, the registration of the payment card, and the registration of the communication identifier;
  receive, with the communication interface, a plurality of transactions of the user, relating to payments with the payment card of a plurality of trades of commodities between the user and a plurality of various retailers;
  generate a plurality of packets, relating to the payments with the payment card, formed on the basis of the received plurality of the transactions;
  insert transaction information relating to the payments and supplementary information into the plurality of the packets;
  transmit, with the communication interface, the plurality of the packets to the mobile apparatus addressed with the communication identifier;
  generate a virtual discount coupon on the basis of the transaction information such that the virtual discount coupon is good for a predetermined period of time for purchasing a commodity from the retailer; and
  insert the virtual discount coupon into the packets.

17. A computing resource comprising
  a communication interface,
  a memory interface,
  one or more processors, and
one or more memories including computer program code,
  the one or more memories and the computer program code configured to, with the one or more processors, cause the computing resource at least to perform:
  receive, with the communication interface, a registration of a payment card of a user of a mobile apparatus, and a registration of a communication identifier addressing a wireless transceiver of the mobile apparatus and associated with the registration of the payment card, from the mobile apparatus;
  store, with the memory interface, the registration of the payment card, and the registration of the communication identifier;
  receive, with the communication interface, a plurality of transactions of the user, relating to payments with the payment card of a plurality of trades of commodities between the user and a plurality of various retailers;
  generate a plurality of packets, relating to the payments with the payment card, formed on the basis of the received plurality of the transactions;
  insert transaction information relating to the payments and supplementary information into the plurality of the packets;
  transmit, with the communication interface, the plurality of the packets to the mobile apparatus addressed with the communication identifier;
  generate an event for a loyalty program on the basis of the transaction information such that the event comprises a virtual stamp on a virtual loyalty card of the retailer; and
  insert the loyalty program event into the packets.

18. A computing resource comprising
  a communication interface,
  a memory interface,
  one or more processors, and
one or more memories including computer program code,
  the one or more memories and the computer program code configured to, with the one or more processors, cause the computing resource at least to perform:
  receive, with the communication interface, a registration of a payment card of a user of a mobile apparatus, and a registration of a communication identifier addressing a wireless transceiver of the mobile apparatus and associated with the registration of the payment card, from the mobile apparatus;
  store, with the memory interface, the registration of the payment card, and the registration of the communication identifier;
  receive, with the communication interface, a plurality of transactions of the user, relating to payments with the payment card of a plurality of trades of commodities between the user and a plurality of various retailers;
  generate a plurality of packets, relating to the payments with the payment card, formed on the basis of the received plurality of the transactions;
  insert transaction information relating to the payments and supplementary information into the plurality of the packets;
  transmit, with the communication interface, the plurality of the packets to the mobile apparatus addressed with the communication identifier;
  generate an event for a loyalty program on the basis of the transaction information such that the event belongs to a chain of past recorded and future planned events, the chain of events constituting an interactive loyalty game rewarding the user for performing trades belonging to the chain of events; and
  insert the loyalty program event into the packets.

* * * * *